United States Patent [19]

Dixon et al.

[11] 4,211,664

[45] Jul. 8, 1980

[54] PROCESS FOR MAKING COMPOSITE MAGNETIC MATERIAL

[75] Inventors: David R. Dixon, Keilor; Jack Lydiate, East Rosanna; Frederick J. Lubbock, Beaumaris, all of Australia

[73] Assignees: ICI Australia Limited, Melbourne; Commonwealth Scientific and Industrial Research Organization, Campbell, both of Australia

[21] Appl. No.: 947,401

[22] Filed: Oct. 2, 1978

[30] Foreign Application Priority Data

Oct. 7, 1977 [AU] Australia .............................. 1980/77

[51] Int. Cl.$^2$ .............................................. B01D 39/00
[52] U.S. Cl. .................................. 252/62.54; 210/502; 210/510; 252/184

[58] Field of Search .............................. 252/62.54, 184; 210/502, 510

[56] References Cited

U.S. PATENT DOCUMENTS

| | | | |
|---|---|---|---|
| 3,726,803 | 4/1973 | Bayless et al. | 252/316 |
| 4,082,681 | 4/1978 | Takayama et al. | 252/62.1 P |
| 4,133,774 | 1/1979 | Bryako et al. | 252/62.1 D |

*Primary Examiner*—F. C. Edmundson
*Attorney, Agent, or Firm*—Cushman, Darby & Cushman

[57] ABSTRACT

A process for making dimensionally-stable composite materials comprising adsorbents and magnetic particles embedded in a porous matrix of organic polymeric materials. The magnetic particles enable the composites to be easily and rapidly removed from treated solutions after the adsorption stage is complete.

13 Claims, No Drawings

PROCESS FOR MAKING COMPOSITE MAGNETIC MATERIAL

This invention relates to improved materials which are useful for the separation of small quantities of organic material from solution.

It is well known that dissolved materials can be adsorbed from solution using solid particles which have suitable surfaces. The most common of such adsorbing materials is activated carbon which is used extensively throughout the chemical and process industries. It is typically used in the form of carbon black, graphite, or charcoals. Other materials with suitable adsorbing properties are the various naturally-occurring clays, for example, fuller's earth, and other mineral powders. Examples of the latter include quartz, silica gel, titanium dioxide, bauxite, zeolite and many metallic oxides.

The adsorption process involves the physical attachment of the dissolved material to the particle surfaces and is a reversible process in that the adsorbed material can usually be removed through suitable treatment.

Generally such adsorption is relatively non-selective and in the presence of a mixture of dissolved materials, the adsorbent will remove part or all of such materials. It is therefore a process not suited to removal of one particular constituent of a solution, either an unwanted impurity or a desired compound which occurs in small quantity. In many cases, therefore, a more selective adsorbent is required.

Another disadvantage of adsorption with carbon and other adsorbents is the difficulty in separating the adsorbent from other solid, undissolved materials present in the system. Thus, it is often desired to remove a small amount of dissolved material from a mixture which contains suspended products, without removing such suspended products, and solid adsorbents of known type do not lend themselves to such a process.

There has been a need, therefore, to provide adsorbent materials which will not only separate small quantities of dissolved material from a solution, but will also readily separate from the solution after adsorption has taken place. One approach is to provide a composite material which is porous and includes an adsorbent in such a way that the product to be separated from a solution will diffuse into the composite while at the same time, larger unwanted molecules will be excluded from entering the material, and wherein the said composite material is made so as to include magnetic particles whereby the composite may be easily and rapidly separated from the mixture after adsorption has taken place.

In this approach the composite material typically comprises adsorbent particles and magnetic particles embedded in a porous matrix of organic polymeric material, the porosity of the matrix being such as to allow small molecules of molecular weight up to several hundred to enter freely into the interstitial structure of the matrix but to exclude large molecules of higher molecular weight whereby the composite material functions selectively to adsorb dissolved materials from solution.

Unfortunately when the porous matrix is made by conventional means the composite material is unsatisfactory in that it lacks dimensional stability and is in the form of very irregular particles. The procedure does not yield the product in the form of spherical particles or beads which is essential for ease of preparation, isolation, storage, and subsequent handling.

It is an object of our invention to provide a process of making composite materials comprising adsorbents, wherein said composite materials have dimensional stability and can readily be prepared in spherical or bead-like form.

Accordingly we provide a process of making a composite material comprising the steps of mixing adsorbent particles and magnetic particles with a material capable of forming a crosslinked polymer and a crosslinking agent, followed by crosslinking to produce a pore size such as will exclude molecules of more than a predetermined order of molecular weight from entering the interstitial structure of the composite, said process characterized in that a polymeric dispersant is incorporated in the crosslinking step.

The process of our invention will now be described by reference to a typical procedure used for the preparation of the composites.

An aqueous phase containing the adsorbent and the magnetic particles is prepared by adding appropriate quantities of these materials, together with the polymeric dispersant, to an aqueous solution of the material capable of forming the crosslinked polymer, followed by thorough mixing to form an aqueous dispersion. The pH of the aqueous dispersion can be adjusted to the desired level by addition of acid.

An organic phase is then prepared by mixing the organic dispersion medium and low molecular weight dispersant at the desired temperature. The aqueous dispersion is then added to the organic phase, followed by the required amount of crosslinking agent.

When crosslinking is completed the product is separated and washed. The separation will typically comprise the steps of centrifuging with a basket centrifuge, washing in the centrifuge with an aqueous solution of a surfactant to remove the residual organic medium, transferring to another vessel for washing with a hot aqueous solution of dispersant, filtration, washing with hot water and then a solvent, followed by drying at an elevated temperature.

The function of the solvent is to assist in the removal of water and the choice of solvent is not narrowly critical. While we typically use acetone other solvents such as alcohols may also be used. When acetone is used a convenient drying temperature is 90° C.

In a further embodiment of our invention the polymeric dispersant is used in the organic phase, and a low molecular weight dispersant in the aqueous phase. In a still further embodiment of our invention polymeric dispersants are used in both the aqueous and the organic phases.

The choice of the dispersant is to some extent dependent on the phase in which it is employed. For the aqueous phase suitable dispersants are polycarboxylates, for example polyacrylates and polymethacrylates. Particularly useful are copolymers of methoxypolyethyleneglycol methacrylate with either acrylic or methacrylic acid.

For the organic phase the polymeric dispersant may be a copolymer such as lauryl methacrylate/hydroxyethyl acrylate, lauryl methacrylate/hydroxyethyl methacrylate, 2-ethylhexyl acrylate/acrylic acid, 2-ethylhexyl acrylate/hydroxyethyl acrylate, 2-ethylhexyl acrylate/methacrylic acid, 2-ethylhexyl acrylate/hydroxyethyl methacrylate, 2-ethylhexyl acrylate/hydroxypropyl methacrylate or stearyl methacrylate/hydroxyethyl methacrylate, or a mixture of two or more of these.

Where a low molecular weight dispersant is added to one of the phases, any of the conventional dispersants of this type may be used. For example "Teric" PE68 a polypropylene glycol ethoxylate may be used in the aqueous phase and "sorbitan trioleate may be used in the organic phase.

The process of our invention is applicable to a wide range of matrix materials. For example, suitable matrix materials for the composite includes hydrophilic polymers derived from polyvinyl alcohol, cellulose and certain of its ethers, polyacrylamide or polymethacrylamide, polyamides such as 6,6-nylon, and polyethylene glycol. Suitable crosslinking agents for these polymers can be selected by those skilled in the art.

For example, there are many known reagents for crosslinking polyvinyl alcohol such as formaldehyde and other aldehydes, in particular dialdehydes such as terephthaldehyde and glutaraldehyde; dimethylol ured, tetrabutyl titanate, bis-3-methoxy propylidene, pentaerythritol, diazonium and tetrazonium salts, and boric acid. Radiation may also be used. Other crosslinking reagents which may be used are those known to crosslink cellulose, e.g., N-methylol and N-methylol ether derivatives of amines, amides and ureas, such as dimethylol dihydroxy ethylene urea and ethyl N,N-dimethylol carbamate; diepoxides such as diglycidyl ether; ethyleneimine derivatives such as tris-(1-aziridinyl)-phosphine oxide; divinyl sulphone and bis-(2-hydroxyethyl)sulphone; epichlorhydrin; phosgene and diacid dichlorides; and 4,5-dihydroxy-1,3-dimethyl-2-imidazolidinone. Polyacrylamide and polymethacrylamide may also be conveniently crosslinked with epichlorhydrin. The polyols may be insolubilized by reaction with di-isocyanates.

Generally a catalyst is added with the crosslinking agent to promote the crosslinking. Appropriate catalysts are well known to those skilled in the art, for example, in the case of a dialdehyde crosslinking agent an acid catalyst is suitable. Other polymers may be used together with suitable crosslinking agents by means well known to polymer chemists.

The size of the particles or beads of composite adsorbent materials can be controlled by proper selection of the concentration of dispersant in the aqueous or organic phases, the stirring mode, ratio of aqueous phase to organic phase, pH, and the temperature. For example, the preparation of larger spherical particles is favoured by reduced stirring, a low concentration of dispersant, low temperatures, and high pH. Where bead size and structure is unimportant the composite may be produced by rapid crosslinking, and the final product ground as required. In this case low pH, high temperature, and vigorous stirring may usefully be employed.

It may be desirable to protect the adsorbent particles during the process of our invention by a coating of material which can readily be removed after the adsorbent is incorporated into the composite. The nature of the protecting agent will depend largely on the particular adsorbent being used. Aliphatic acids, such as acetic and propionic acids, may be used. Starches and gelatine can, for example, be removed subsequently by enzymatic means. The protecting agents may be applied to the adsorbent particles by simple mixing and stirring followed by filtration and washing, or solutions of protecting agents may be sprayed onto the adsorbent particles and the solvent removed by evaporation.

The invention is of particular use in the food and related processing industries where trace quantities of materials need to be separated from complex mixtures of solids and liquids.

The invention is now illustrated by, but not limited to, the following examples.

EXAMPLE 1

(a) Preparation of the aqueous phase

To a solution of polyvinyl alcohol 1(60 g; 89% w/w hydrolyzed) in water (420 ml) was added a polypropylene glycol ethoxylate (6 g), gammamagnetite (120 g), and activated carbon (120 g) which had previously been thoroughly wetted with glacial acetic acid. The mixture was thoroughly stirred until the solids were dispersed.

(b) Preparation of the organic phase

2-Ethylhexyl acrylate/hydroxyethyl methacrylate copolymer (10:1 mole ratio; 6 g of a 50% w/w solution in xylene) was dissolved in mineral oil (94 g). The aqueous dispersion (50 g) was adjusted to pH 1.5 with concentrated hydrochloric acid and added to the stirred organic phase. After stirring for approximately 15 minutes, glutaraldehyde (2.6 g; 25% w/w aqueous solution) was added and the mixture stirred for two hours at ambient temperature.

The mixture was then centrifuged and washed several times with a 1% w/w aqueous solution of a $C_{12}$-alcohol alkoxylate. The product was transferred to a reactor and stirred for one hour at 80° C. with 200 mls of 1% w/w aqueous solution of a $C_{12}$-alcohol alkoxylate. The product was then filtered, washed several times with water and finally washed with acetone before drying at 80° C.

EXAMPLE 2

The procedure of Example 1 was repeated except that the mole-ratio of the copolymer of the organic phase was 3:1. The product was isolated in the same way.

EXAMPLES 3-5

The procedure of Example 1 was repeated except that the copolymer of the organic phase was replaced by each of the following dispersants in turn.

| Example | Dispersant |
| --- | --- |
| 3 | 2-ethylhexyl acrylate/acrylic acid; 10:1 mole ratio |
| 4 | lauryl methacrylate/hydroxyethyl methacrylate; 10:1 mole ratio |
| 5 | stearyl methacrylate/hydroxyethyl methacrylate; 10:1 mole ratio |

EXAMPLE 6

The procedure of Example 1 was repeated except that the polypropylene glycol ethoxylate in the aqueous phase was replaced by 2-ethylhexyl acrylate/hydroxyethyl methacrylate (10:1 mole ratio). The product was isolated as before.

EXAMPLE 7

The procedure of Example 6 was repeated except that the copolymer dispersant of the organic phase was replaced by the low molecular weight surfactant, sobitan trioleate. The product was isolated as before.

EXAMPLE 8–10

These examples illustrate the effect of polymeric dispersant concentration on the particle size distribution of the composites formed.

The procedure of Example 1 was followed except that the xylene was replaced by O-dichlorobenzene and the dispersant concentration was varied over the range of 0.1 to 1.0% w/w. The results are tabled, showing acceptable particle size distribution at all concentrations.

| Example | Dispersant Concentration % w/w | PARTICLE SIZE DISTRIBUTION (% w/w) | | | | |
|---|---|---|---|---|---|---|
| | | >417 μm | 175–417 μm | 104–175 μm | 61–104 μm | <61 μm |
| 8 | 0.1 | 3.28 | 42.92 | 31.29 | 2.13 | 0.27 |
| 9 | 0.25 | 4.20 | 53.92 | 35.40 | 5.91 | 0.57 |
| 10 | 0.5 | 5.76 | 56.47 | 23.25 | 10.35 | 4.17 |
| 11 | 1.0 | 1.40 | 30.06 | 55.92 | 12.16 | 0.47 |

EXAMPLE 12

This is a comparative Example using a low molecular weight surfactant of the prior art.

The aqueous phase was prepared as described in Example 1. The organic phase was a 3% w/w solution of "Span" 85 in O-dichlorobenzene. The procedure of Example 1 was then followed and after gelation the product was found to be in the form of irregular aggregates.

The above procedure was repeated several times, increasing the surfactant concentration up to 6% w/w and varying the pH between 1.5 and 2.0, and the temperature between 11 and 35° C. Various stirrers were tried including two-bladed propellers of low speed casting particles either upward or downward, paddles and fluted discs. In every case unsatisfactory aggregates were obtained.

We claim:

1. A process of making a composite material comprising the steps of mixing adsorbent particles and magnetic particles with a material capable of forming a crosslinked polymer and a crosslinking agent, followed by crosslinking, said process characterized in that a polymeric dispersant is incorporated in the crosslinking step.

2. A process according to claim 1 wherein the adsorbent particles and magnetic particles are mixed in an aqueous phase, and the material capable of forming a crosslinked polymer in an organic phase.

3. A process according to claim 2 wherein the polymeric dispersant is added to the aqueous phase.

4. A process according to claim 2 wherein the polymeric dispersant is added to the organic phase.

5. A process according to claim 3 wherein the polymeric dispersant is a polycarboxylate.

6. A process according to claim 5 wherein the polycarboxylate is selected from the group consisting of polyacrylates and polymethacrylates.

7. A process according to claim 6 wherein the polycarboxylate is the copolymer of methoxy polyethyleneglycol methacrylate with acrylic acid.

8. A process according to claim 6 wherein the polycarboxylate is the copolymer of methoxypolyethyleneglycol methacrylate with methacrylic acid.

9. A process according to claim 4 wherein the polymeric dispersant comprises a copolymer selected from the group consisting of lauryl methacrylate/hydroxyethyl methacrylate, 2-ethylhexyl acrylate/acrylic acid, 2-ethylhexyl acrylate/hydroxyethyl acrylate, 2-ethylhexyl acrylate/methacrylic acid, 2-ethylhexyl acrylate/hydroxyethyl methacrylate, 2-ethylhexyl acrylate/hydroxypropyl methacrylate and stearyl methacrylate/hydroxyethyl methacrylate.

10. A process according to claim 1 wherein the adsorbent is carbon.

11. Composites prepared by a process according to claim 1 or 2.

12. A process for making a composite material comprising the steps of:
   (i) forming an aqueous mixture containing adsorbent particles, magnetic particles and a solution of a material capable of forming a crosslinked polymer;
   (ii) stirring said aqueous mixture with an organic phase, wherein a crosslinking agent and a polymeric dispersant is present during said stirring step; and
   (iii) crosslinking said material capable of forming a crosslinked polymer.

13. A dimensionally-stable composite capable of selectively adsorbing dissolved materials according to the molecular size of said materials, said composite consisting essentially of adsorbent particles and magnetic particles in a porous, crosslinked polymeric matrix.

* * * * *